Jan. 20, 1942.                C. W. BAKER                2,270,748
                    SCREW AND LOCK WASHER ASSEMBLY
                         Filed March 5, 1940
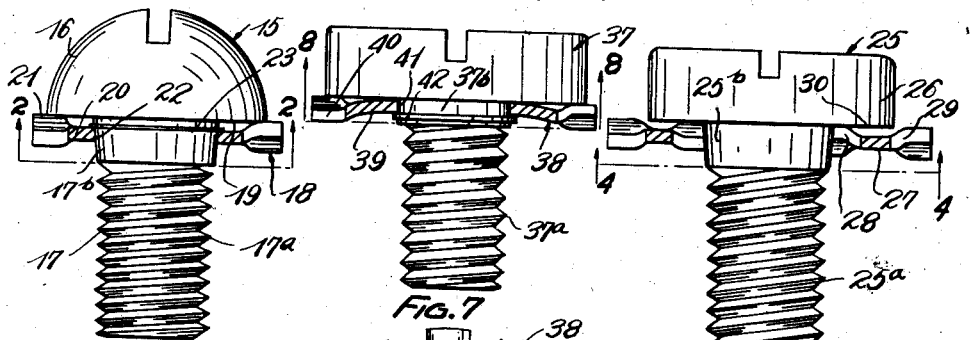
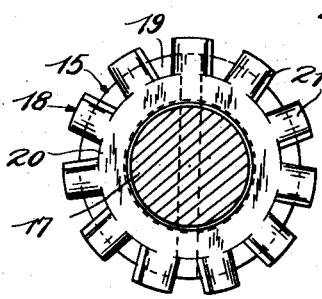
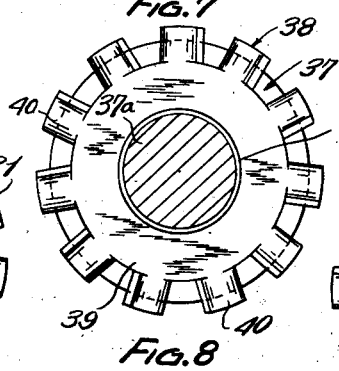
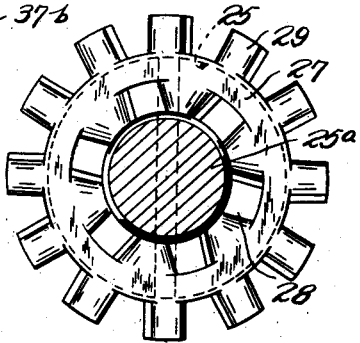
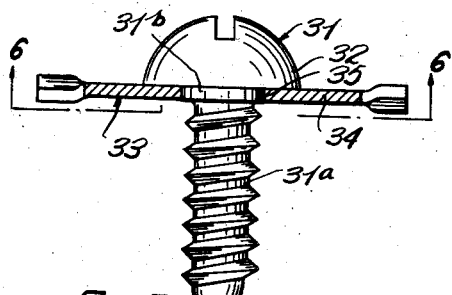
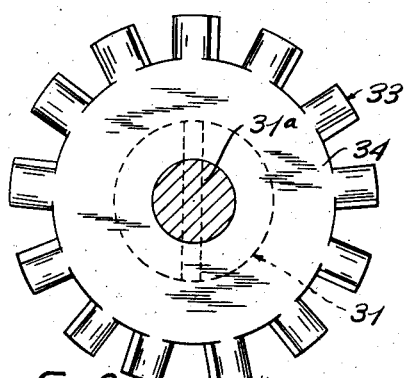
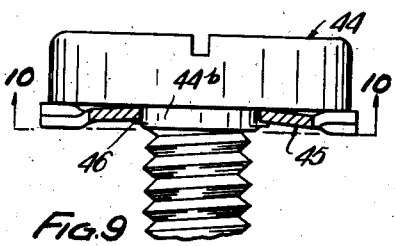
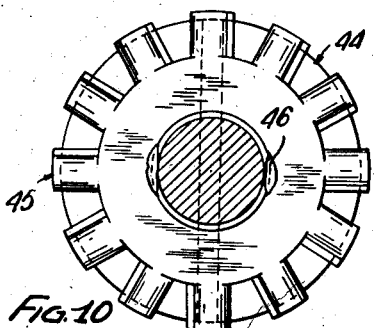
INVENTOR.
CHARLES W. BAKER
BY
ATTORNEYS Patented Jan. 20, 1942

2,270,748

UNITED STATES PATENT OFFICE 2,270,748

SCREW AND LOCK WASHER ASSEMBLY

Charles W. Baker, Shaker Heights, Ohio, assignor to The National Screw & Manufacturing Company, Cleveland, Ohio, a corporation of Ohio Application March 5, 1940, Serial No. 322,369

12 Claims. (Cl. 10—10)

This invention relates to screw and lock washer assemblies, and more particularly to units of this character in which the lock washers are preassembled on the screws in such a manner as to be retained thereon during handling and shipment and to facilitate the application of the screws to the work. The invention also relates to a method of forming such screw and lock washer assemblies.

An object of the invention is to provide an improved screw and lock washer assembly in which the screw has an unthreaded portion adjacent the head on which the lock washer is mounted and thereby retained in operative relation to the clamping surface of the head.

Another object of this invention is to provide an improved screw and lock washer assembly in which the unthreaded portion of the stem of the screw is of larger diameter than the outside diameter of the threaded portion and the lock washer is retained on such unthreaded stem portion by being forced or staked thereon.

A further object of the invention is to provide an improved method of producing screw and lock washer assemblies involving the forming of a screw having an unthreaded stem portion adjacent its head of larger diameter than the outside diameter of the threaded stem portion and forming a lock washer with an opening of a size to pass over such threaded portion of the stem, and then mounting the washer on the unthreaded portion by passing the washer axially over the threaded portion and pressing or staking the same onto the unthreaded portion.

Other objects and advantages of the invention will be apparent from the following description when taken in conjunction with the accompanying sheet of drawings in which, Fig. 1 is a side elevation showing a screw and lock washer assembly made according to the present invention, a portion of the lock washer being broken away.

Fig. 2 is a sectional view taken through the screw as indicated by the line 2—2 of Fig. 1.

Fig. 3 is an elevation showing another screw and lock washer assembly of this invention and in which the lock washer has both internal and external teeth.

Fig. 4 is a sectional view thereof taken through the screw as indicated by line 4—4 of Fig. 3.

Fig. 5 is a side elevation showing another form of screw and lock washer assembly contemplated in the present invention.

Fig. 6 is a sectional view taken through the screw on line 6—6 of Fig. 5.

Fig. 7 is a side elevation showing still another screw and lock washer assembly in which a portion of the unthreaded section of the stem is deformed to retain the lock washer in place.

Fig. 8 is a sectional view taken through the screw as indicated by line 8—8 of Fig. 7.

Fig. 9 is a partial side elevation showing a screw and lock washer assembly similar to that of Fig. 7 but in which the unthreaded section of the stem is deformed at circumferentially spaced points only, and Fig. 10 is a sectional view taken through the screw as indicated by the line 10—10 of Fig. 9.

More detailed reference will now be made to the drawing in which several embodiments of the invention have been illustrated. It will be understood, of course, that the invention is not to be regarded as limited to the particular forms of screws and lock washers herein illustrated and described, but is applicable as well to numerous other forms of screws and fasteners.

Before proceeding with the detailed description of the various screw and lock washer assemblies illustrated in the drawing, it might well be explained at this point that preassembling lock washers on the screws with which they are to be used affords certain important advantages as compared with the practice of manually applying the lock washers to the screws at the time of use as heretofore carried out by the workman on the job. The use of preassembled screw and lock washer units results in a considerable saving of the time of the workman who applies the screws to the work, because he is required to handle fewer parts and the proper positioning of the lock washer is assured without any further act or special attention of the workman. Moreover, when the lock washers are secured to the stems of the screws, as contemplated by the present invention, the application of the screws to the work is facilitated because the portions of the lock washers projecting beyond the screw heads afford a secure grasp, enabling the operator to start the screws in the holes more readily than has been possible heretofore.

In forming screw and lock washer assemblies according to the present invention there is first formed or provided a screw having a stem which is threaded for a substantial portion of its length but which has an unthreaded portion or section immediately adjacent the underside or clamping surface of the head. This screw is so made that the unthreaded stem portion or section has a diameter greater than the outside diameter of the threaded portion of the stem. A hardened lock washer of the type comprising a toothed ring is formed with its opening of a size to pass over the threaded portion of the stem and to engage the unthreaded section with a sufficiently tight fit thereon to retain the washer on the stem in operative relation to the clamping surface thereof. The lock washers may be assembled on the screws by any appropriate apparatus, such as that disclosed in copending application Serial No. 291,049, filed August 19, 1939. The unthreaded section of the screw stem may be cylindrical in form or may be tapered, and the lock washer may be retained on the unthreaded section simply by being pressed or forced thereon or by such a press or force fit supplemented by a distortion of the unthreaded portion of the stem just below the washer.

The screw and lock washer assembly illustrated in Figs. 1 and 2 comprises a screw 15 having a head 16 and a stem 17, and a lock washer 18 mounted on the stem adjacent the underside or clamping surface 19 of the head.

The stem 17 has a threaded section 17a representing a substantial portion of its length and an unthreaded section 17b immediately adjacent the underside or clamping surface 19 of the head. The stem of the screw is so formed that the unthreaded section 17b is larger than the outside diameter of the threaded section 17a. In this instance the unthreaded section 17b is tapered although it may be cylindrical if desired. When the unthreaded section is tapered, as here shown, its mean diameter is larger than the outside diameter of the threaded section of the stem.

The hardened lock washer 18 is of the type having a continuous ring portion 20 and an annular series of locking teeth 21 carried by such ring portion. The ring portion of this lock washer has an opening 22 of a size to pass over the threaded section 17a of the stem and to engage tightly on the unthreaded stem section 17b. This opening of the lock washer is preferably of a size such that the washer is required to be pressed or forced onto the unthreaded stem section and thereby becomes firmly mounted on the latter with its locking teeth in adjacent operative relation to the clamping surface 19 of the head. When the lock washer is thus forced onto the unthreaded section 17b more or less of a metal fin or flash 23 may be scraped up from the surface of this stem portion as shown in the drawing.

When the lock washer 18 has been mounted on the screw 15 in the manner and relation just described above, the washer will be retained on the screw during shipment or handling thereof and its connection with the screw will be sufficiently strong or tight to enable the workman to grasp the assembly by the projecting portions of the lock washer and to thereby rotate the screw to start the same into the hole of the work to which it is to be applied.

Figs. 3 and 4 show another screw and lock washer assembly generally similar to that above described but in which the screw 25 is of the type having a flat head 26 and the lock washer 27 is of the type having an internal annular series of locking teeth 28 as well as an external annular series 29 of such teeth.

In this assembly the screw 25 has a threaded section 25a and an unthreaded stem section 25b immediately adjacent the underside of the head which is of larger diameter than the threaded section and may be slightly tapered. The lock washer 27 is mounted on the screw by being pressed or forced onto the unthreaded stem portion 25b so as to become fixed thereon with its teeth in adjacent operative relation to the clamping surface 30 of the head.

Figs. 5 and 6 show another screw and lock washer assembly in which the screw 31 is of the self-tapping type frequently used in sheet metal and automobile body work. The screw has a threaded portion 31a representing the major portion of the stem and an unthreaded stem section 31b adjacent the underside of the head 32. In this instance the unthreaded stem section 31b is shown as being cylindrical in shape, although it may be made of tapered form as shown in Figs. 1 and 3.

The lock washer 33 has a ring or disk portion 34, the opening 35 of which is of a size to pass over the thread of the stem portion 31a and to engage on the unthreaded stem section 31b with a sufficiently tight fit to retain the washer thereon. For certain reasons the washer may be considerably larger in diameter than the diameter of the head, one advantage being that the assembly can be handled and the screw started into the hole by grasping the periphery of the washer. A lock washer having an outside diameter comparable with that of the screw head 32 could, of course, be used if desired.

Figs. 7 and 8 show a screw and lock washer assembly comprising a screw 37 and a lock washer 38. The screw has a threaded stem portion 37a and an unthreaded stem section 37b adjacent the head and of larger diameter than the outside diameter of the threaded portion. The lock washer 38 has a continuous ring portion 39 carrying an annular series of locking teeth 40. The opening 41 of the ring portion of the washer is of a size to pass over the threaded section 37a and onto the unthreaded section 37b.

The washer is prevented from moving downwardly off of the unthreaded stem section 37b by an annular ridge or flange 42 which may be thrown up on the unthreaded stem section immediately below the washer. This ridge or flange 42 may be formed on the unthreaded stem section by a swaging operation performed thereon by any suitable dies or tools as for example a tool movable axially of the stem of the screw. The size of the opening 41 of the washer may be such as to permit the washer to rotate on the unthreaded stem portion 37b, but preferably, the washer opening grips this stem portion to prevent relative rotation therebetween.

Instead of forming a complete annular ridge or flange on the unthreaded portion of the stem such as the ridge 42 just described above, the unthreaded stem portion may be deformed at circumferentially spaced points only for retaining the washer thereon. An assembly embodying this characteristic is shown in Figs. 9 and 10 in which the screw 44 and the washer 45 are similar, respectively, to the screw 37 and the washer 38 of Fig. 7, but the washer is retained on the unthreaded stem portion 44b by the lugs or projections 46 formed at circumferentially spaced points on the unthreaded stem section immediately below the washer 45. In the units illustrated in Figs. 7 to 10 inclusive, in which the washer is held against removal from the stem of the screw by deformed portions of the latter, it may be conveniently referred to as being "staked" onto the screw.

In all of the screw and lock washer assemblies made according to this invention, including the embodiments above described, the lock washers may be hardened and the threads of the screws are rolled or otherwise formed thereon before the lock washers are applied. Some or all of these screws can be hardened by suitable treatment after threading thereof and prior to the application of the lock washers to thereby adapt the screws for use as self-tapping or sheet metal screws.

From the foregoing description and the accompanying drawing it will now be readily understood that the present invention provides an improved screw and lock washer assembly and a method of manufacture, in which hardened lock washers are preassembled on the screws with which they are to be used and are mounted on an unthreaded stem portion in operative relation to the clamping surface of the head. It will be seen furthermore that by providing the screw with an unthreaded stem portion of larger size than the threaded section and forming the washer with an opening of a size to pass over the threaded section and to grip the unthreaded stem section when pressed or forced thereon, the washer will be retained on the screw during shipping or handling thereof and can be grasped by the workman to facilitate rotation of the screw in starting the same into the hole.

While the present invention has been illustrated and described in considerable detail it will be understood, of course, that there is no intention to limit the same to the precise details of construction and arrangements herein disclosed, but the invention should be regarded as including all changes, modifications and variations which come within the scope of the appended claims.

The invention herein disclosed is claimed as follows:

1. A screw and lock washer assembly comprising a headed screw having adjacent its head an unthreaded stem portion of larger diameter than the outside diameter of the threaded portion of the stem, and a hardened lock washer mounted on said unthreaded portion, said washer having an opening of a size to pass over the threaded portion of the stem and being in tight-fitting engagement with said unthreaded stem portion for retaining the washer on the latter.

2. A screw and lock washer assembly comprising a headed screw having adjacent its head an unthreaded tapered stem portion of greater mean diameter than the outside diameter of the threaded portion of the stem, and a hardened lock washer mounted on said tapered stem portion, said washer having an opening of a size to pass over the threaded portion of the stem and into tight-fitting engagement with said tapered stem portion for retaining the washer thereon adjacent the head.

3. The method of making a screw and lock washer assembly which comprises forming a headed screw with an unthreaded stem portion adjacent the head of larger mean diameter than the outside diameter of the threaded portion, providing a hardened lock washer with an opening larger than the outside diameter of said threaded portion and slightly smaller than the diameter of said unthreaded portion, and forcing the washer axially onto said unthreaded portion to mount the same thereon.

4. The method of making a screw and lock washer assembly which comprises forming a headed screw with a tapered unthreaded stem portion adjacent the head of larger mean diameter than the outside diameter of the threaded portion, providing a lock washer with an opening slightly larger than the outside diameter of said threaded portion, and forcing the washer axially onto said tapered portion to mount the same thereon.

5. The method of making a screw and lock washer assembly which comprises providing a headed screw with an unthreaded stem section adjacent the head of larger diameter than the outside diameter of the threaded section of the stem, providing a lock washer having an opening slightly larger than the outside diameter of said threaded stem section, moving the washer axially of the screw to a position surrounding said unthreaded section, and deflecting the metal of said unthreaded section at circumferentially spaced points to retain the washer thereon.

6. A lock washer and fastener assembly including a rotary threaded fastener having a clamping surface extending outwardly from the threaded portion thereof, a peripheral lock washer receiving portion extending axially beyond said clamping surface and having a diameter greater than the outer diameter of the thread, and a continuous annular relatively hard lock washer forced axially upon said peripheral receiving portion in tight fitting relation so that it is permanently secured against axial displacement, said lock washer having resilient locking teeth positioned in operative association with said clamping surface.

7. A screw and lock washer assembly consisting of a headed screw having between its head and its thread a peripheral lock washer receiving portion of a greater diameter than the outer diameter of the thread, and a continuous annular relatively hard lock washer forced axially upon said receiving portion in tight fitting relation so that it is permanently secured against axial displacement, said lock washer having resilient locking teeth positioned in operative association with the clamping side of the screw head.

8. The method of preassembling a lock washer and a rotary threaded fastener having a clamping surface and a peripheral lock washer receiving portion positioned in the vicinity of one extremity of the thread on said fastener, which consists in associating a lock washer in encircling relation with respect to said peripheral receiving portion, and upsetting said peripheral portion in the vicinity of said thread extremity by the pressure of a tool urged axially thereof so as to form a protuberance extending beyond the inner margin of the lock washer at the free side thereof.

9. The method of preassembling a lock washer and a rotary threaded fastener having a clamping surface and a peripheral lock washer receiving portion positioned in the vicinity of one extremity of the thread on said fastener, which consists in associating a lock washer in encircling relation with respect to said peripheral receiving portion, and upsetting said peripheral portion in the vicinity of said thread extremity at circumferentially spaced intervals so as to form a plurality of protuberances extending beyond the inner margin of the lock washer at the free side thereof.

10. The method of preassembling a lock washer and headed screw provided with a peripheral lock washer receiving portion in the vicinity of the screw head which is slightly larger in diameter than the outer diameter of the screw thread, which consists in associating a lock washer in encircling relation with respect to said receiving portion, and applying pressure against the outer extremity of said receiving portion in an axial direction so as to upset a protuberance extending beyond the inner margin of the lock washer at the free side thereof.

11. The method of preassembling a lock washer and a headed screw element provided with an annular peripheral lock washer receiving portion of relatively short axial extent in the vicinity of the head, which is slightly larger in diameter than the remaining portion of the screw element, which consists in associating a lock washer in encircling relation with respect to said peripheral annular receiving portion, and applying pressure to the outer extremity of said receiving portion so as to upset a protuberance extending beyond the inner margin of the lock washer at the free side thereof.

12. The method of preassembling a lock washer and headed screw element provided with a peripheral annular lock washer receiving portion of relatively short axial extent in the vicinity of the head, which is slightly larger in diameter than the outer diameter of the remaining portion of the screw, which consists in associating a lock washer in encircling relation with respect to said peripheral annular receiving portion, and applying pressure to the outer extremity of said receiving portion so as to upset a plurality of protuberances extending beyond the inner margin of the lock washer at the free side thereof.

CHARLES W. BAKER.